April 6, 1965   K. E. SUNDSTROM ETAL   3,176,576
TRACKING ACCURACY CONTROL FOR ANALYZERS
Filed May 22, 1961   2 Sheets-Sheet 1
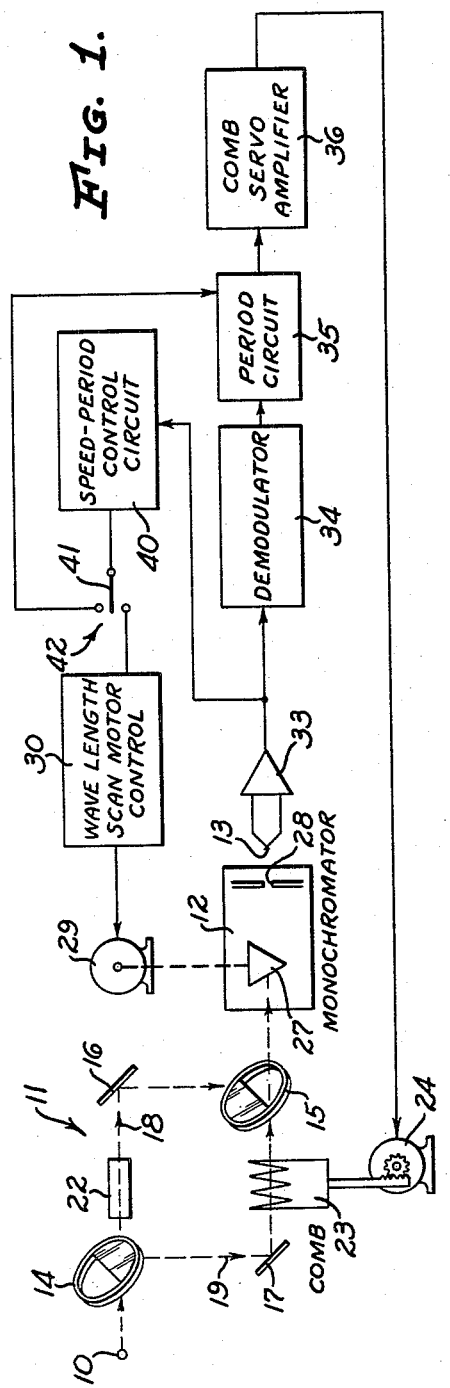
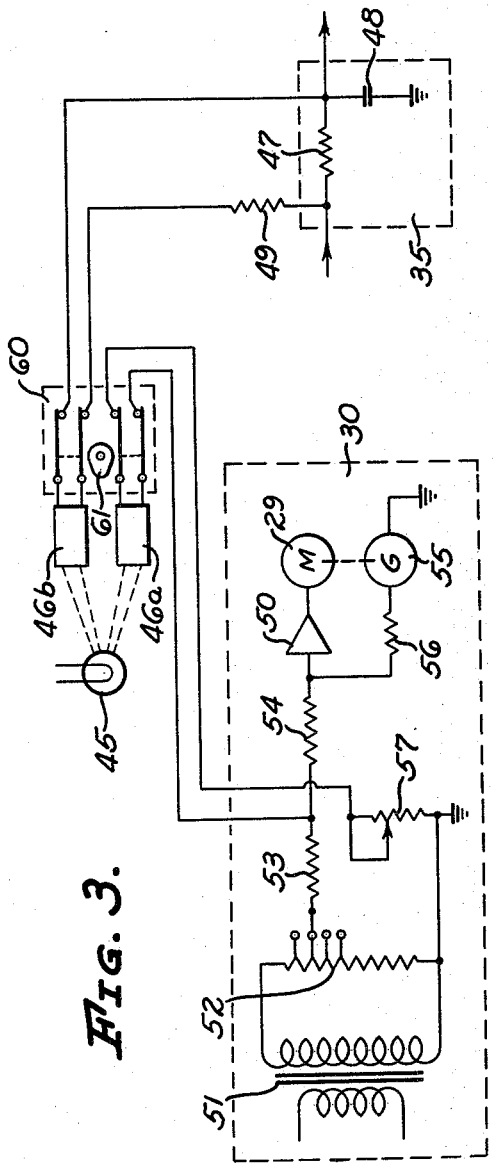
INVENTORS
KARL E. SUNDSTROM,
WILBUR I. KAYE,
KENNETH V. MATTHEWS
BY THEIR ATTORNEYS
HARRIS, KIECH, RUSSELL & KERN

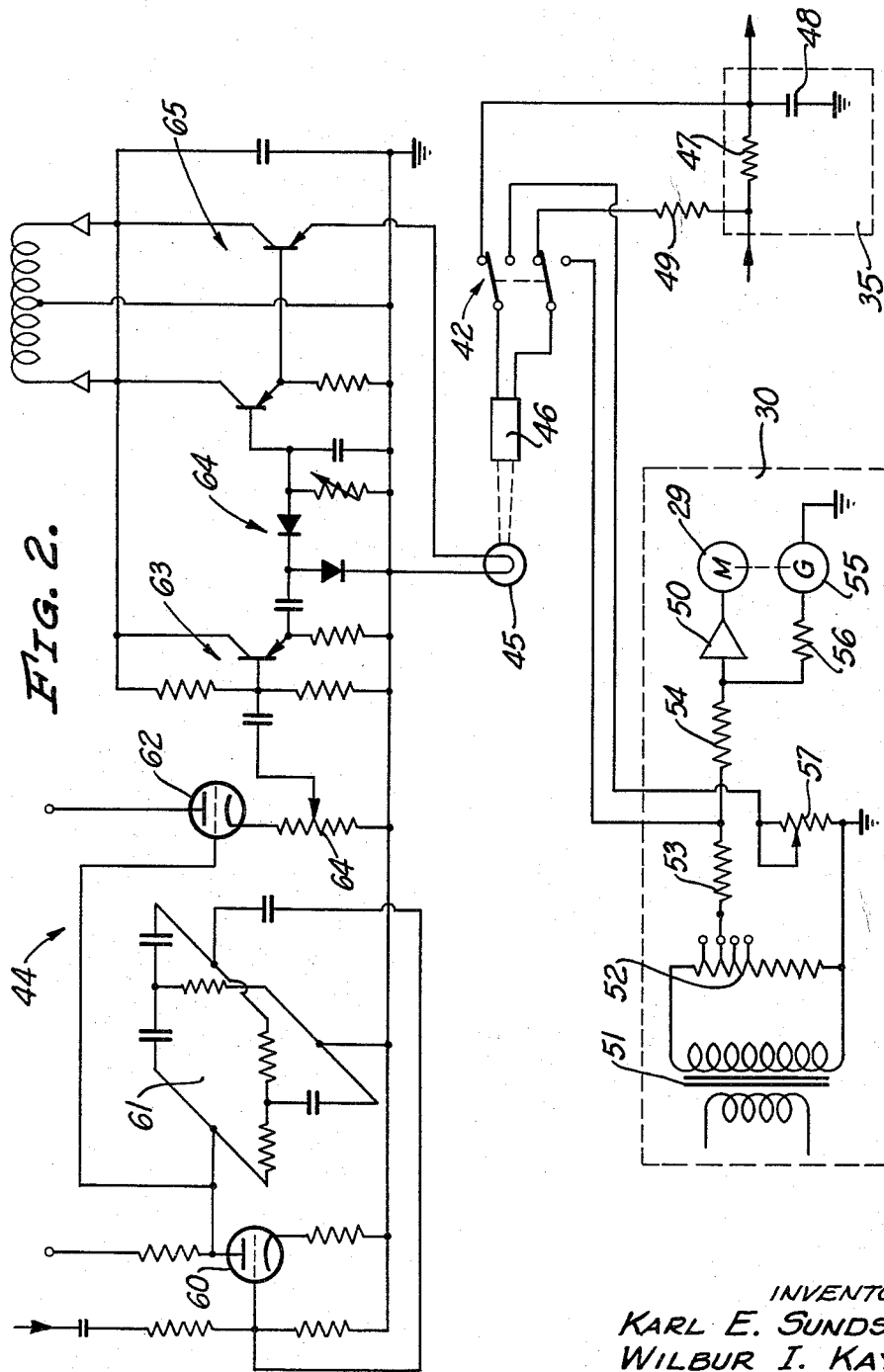

United States Patent Office 3,176,576
Patented Apr. 6, 1965

3,176,576
TRACKING ACCURACY CONTROL FOR ANALYZERS
Karl E. Sundstrom, La Habra, Wilbur I. Kaye, Fullerton, and Kenneth V. Matthews, Garden Grove, Calif., assignors to Beckman Instruments, Inc., a corporation of California
Filed May 22, 1961, Ser. No. 116,641
9 Claims. (Cl. 88—14)

This invention relates to analyzers such as spectrophotometers and will be described herein in conjunction with a double beam optical null instrument utilizing beam intensity balancing. This application is a continuation-in-part of our copending application having the same title, Serial No. 16,515, filed March 21, 1960, now abandoned.

In such an analyzer, light from a source is switched along two paths and recombined at a thermocouple or other electrical signal generator. A sample to be analyzed is placed in one path and the error signal is used to drive a servo which varies the intensity of the beam in the other path to achieve a null or zero signal at the thermocouple. The servo position is a measure of the sample content. The wavelength of the light source is scanned over a range during the measurement to provide a spectrum measure of the sample. Noise due to various causes is present in spectrophotometers as in most other instruments and it is usually desirable to eliminate or reduce the noise or its effects to some acceptable value. Noise is often controlled by reducing the sensitivity of an instrument but a concurrent loss of accuracy is also involved.

It is an object of the present invention to provide an improvement in the tracking accuracy in analyzer instruments such as spectrophotometers without producing significant changes in the noise content. A further object is to provide circuitry for use with analyzers for changing the mode of operation with large error signals. Another object is to provide such circuitry which does not produce undesirable loading effects on the instrument operation and which can be incorporated in existing instruments without requiring circuit design changes.

It is an object of the invention to provide means for decreasing the scanning speed in spectrophotometers and the like in the presence of large error signals while permitting operation of the instrument at higher scanning speeds for low error signals thereby improving the tracking accuracy. It is a further object of the invention to provide means for reducing the time constant of the period control and, hence, increasing the response rate of the beam balancing servo for large error signals while maintaining the relatively large time constant during low signal conditions for noise reduction. Another object is to provide an instrument wherein scan speed control and period or time constant control can be selected as particular operating conditions warrant. Another object of the invention is to provide such an instrument wherein the same circuitry may be used for both scan speed and period control. A particular object of the invention is to provide such an instrument in which both scan speed control and period control can be utilized at the same time.

It is an object of the invention to provide a unique form of tracking accuracy control circuitry including an amplifier having the error signal as an input, a lamp energized by the amplifier output, and a photosensitive unit positioned for radiation by the lamp, with the resistance of the photosensitive unit varying as a function of the lamp output and, hence, the error signal. A further object is to provide such an instrument wherein thte photosensitive unit is utilized as a variable resistor in the scan motor speed control circuit and in the period filter time constant circuit to provide the desired instrument operation as a function of error signal. Another object is to provide such an instrument having a photosensitive unit in each of the control circuits for simultaneous radiation from the lamp.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:
FIG. 1 is a block diagram of a spectrophotometer incorporating the tracking accuracy control of the invention;
FIG. 2 is a schematic diagram of a preferred circuit for the tracking accuracy control; and
FIG. 3 is a schematic diagram of an alternative circuit providing for simultaneous speed and period control.

The instrument of FIG. 1 includes a source 10, a beam switching system 11, a monochromator 12 and a thermocouple 13. The source 10 may be any suitable device which produces radiation over the spectrum being analyzed. The beam switching system includes half-mirrors 14, 15 which are rotated in synchronism, and reflecting mirrors 16, 17, providing a sample beam path 18 and a reference beam path 19. A sample cell 22 is positioned in the sample beam path 18 for containing the sample to be analyzed. Means for varying the intensity of the beam along the reference beam path 19 is positioned therein. A typical example is the comb 23 which is driven into and out of the reference beam path by a motor 24.

The monochromator 12 includes means for dispersing the beam passing therethrough, shown here as a prism 27, and a slit 28 which permits only a small fraction of the dispersed beam to impinge on the thermocouple 13. The prism 27 is rotated by a scan motor 29 during the analysis to scan the entire spectrum of interest past the slit 28. The scan motor 29 is energized from a scan motor control 30 which is ordinarily set to operate the motor at a constant rate. A programmed change in scan speed over the spectrum is usually desired and is conventionally accomplished by coupling the motor to the prism or other dispersing element by means of a cam of appropriate contour.

The thermocouple 13 produces an electrical error signal proportional to the difference in intensity of the beams traversing the sample path and reference path with the error signal cyclically varying at the beam switching rate, which ordinarily is in the range of five to twenty cycles per second.

The error signal from the thermocouple 13 is connected to an amplifier 33, a demodulator 34, a period circuit 35 and an amplifier 36. The output of the amplifier 36 drives the comb motor 24, with the amplifier and motor functioning as the comb servo. The output of the comb motor is also a measure of the absorption at the sample cell and ordinarily drives a recorder or other suitable output device. The demodulator 34 is operated in synchronism with the beam switching system and converts the A.C. error signal to D.C. Various types of demodulators may be used, with the mechanical chopper or switch being preferred at the relatively low frequencies ordinarily encountered in such instruments. The period circuit 35 is a low pass filter that limits the response rate of the comb servo and reduces the sensitivity of the instrument to sharp transients in the error signal such as are ordinarily produced by noise. The time constant of the period circuit is selected as a compromise between the maximum response rate of the comb servo and the acceptable noise level and typically is in the range of one-quarter to sixteen seconds. The simplest form of period circuit, which is used in many instruments, is a resistance-capacitance filter section comprising a series resistor and a shunt capacitor.

It would be desirable in the operation of spectro-photometers to have the scan motor run at a high speed and to omit the period circuit so that a complete spectrum analysis could be completed in a relatively short time with a high degree of accuracy in the recorded output. However, the presence of noise ordinarily requires the period circuit, which reduces the response rate of the comb servo. Then when large error signals are generated, the comb servo lags behind the scan system and errors occur in the recorded output, these errors ordinarily being identified as errors in tracking accuracy. One method of improving the tracking accuracy is to reduce or suppress the scan motor speed during the existence of large error signals so that the comb servo with its limited response rate can accurately follow the error signals. It has been found that the tracking accuracy can also be improved by controlling the time constant of the period circuit with the time constant being reduced during conditions of large error signals so that the response rate of the comb servo increases and permits rapid and accurate operation of the nulling system. Generally, when an analyzer is being operated at a relatively high scanning speed, the time constant of the period circuit will be relatively short and the speed suppression or reduction approach will be used for improving the tracking accuracy. However, when the instrument is being operated at a relatively low speed and with a relatively long period or large time constant, the period suppression or time constant control is preferred so as not to unduly extend the analysis time.

The diagram of FIG. 1 shows a system which may be used for achieving either scan speed suppression or period suppression in a single instrument. The error signal from the amplifier 33 is connected as an input to a control circuit 40, with the output of the control circuit connected to the moving arm 41 of a switch 42. One fixed terminal of the switch 42 is connected to the scan motor control 30 and the other fixed terminal is connected to the period circuit 35 so that scan suppression or period suppression may be manually or automatically selected as desired. When connected to the scan motor control, the output of the control circuit 40 reduces the set speed of the scan motor. Similarly, when connected to the period circuit, the output of the control circuit reduces the time constant of the period circuit. The details of a preferred form of the control circuit 40 are shown in FIG. 2.

An amplifier circuit 44 energizes a lamp 45 as a function of the magnitude of the error signal from the thermocouple 13 and the amplifier 33. The lamp 45 is positioned to direct light onto a photosensitive unit 46 which is connected in circuit with the scan motor control 30 and the period circuit 35 by the switch 42. The photosensitive unit 46 may be a photodiode the resistance of which decreases as the intensity of light impinging thereon increases.

The period circuit 35 is shown as a resistance-capacitance low pass filter section with a series resistor 47 and a shunt capacitor 48. The switch 42 serves to connect the photodiode 46 in series with a resistor 49 with this series combination connected in shunt with the resistor 47. With no light from the lamp 45, the resistance of the diode 46 is quite high and the diode has little effect upon the time constant of the filter. However, as the light from the lamp 45 increases, the resistance of the diode decreases and reduces the time constant to a minimum determined by the relative resistance values of the diode and the resistors 47, 49.

In the scan motor control 30, the motor 29 is driven from an amplifier 50. The amplifier input is provided from an A.C. source through a transformer 51, a tapped resistor 52 and series resistors 53, 54. The normal motor speed is set by selecting the particular tap on the resistor 52 to which the resistor 53 is connected. The motor speed is stabilized by feedback from a generator 55 through a resistor 56.

With the switch 42 in the reverse of the position shown in FIG. 2, the diode 46 is connected in series with a variable resistor 57 between the junction of the resistors 53, 54 and circuit ground. When the resistance of the diode 46 is high, the diode has relatively little effect upon the speed of the motor 29. However, as the resistance of the diode decreases, the resistor 53, the diode and the resistor 57 function as a voltage divider to reduce the input signal to the amplifier 50. The variable resistor 57 provides a control for the minimum input signal to the amplifier.

The circuit 44 includes an amplifier stage tuned to the beam switching frequency, comprising a triode tube 60 and a twin T tuned filter 61. The output of the tuned amplifier is coupled through another triode tube 62 functioning as a cathode follower to a transistor amplifier stage 63. The cathode resistor of the cathode follower is a potentiometer 64 which provides a gain control for the circuit. The output of the amplifier stage 63 is rectified in a diode rectifier and filter stage 64 and provides the drive for a two-stage transistor current amplifier 65. The output of the current amplifier drives the lamp 45.

An alternative form of the control circuit which permits simultaneous use of period and scan speed control is shown in FIG. 3, wherein components identical to those of FIG. 2 are identified by the same reference numerals. Two photosensitive units 46a, and 46b are substitued for the single unit 46 of the circuit of FIG. 2. The unit 46a is connected into the scan motor control circuit 30 through a switch 60 while the unit 46b is coupled to the period circuit 35 through the switch 60. The switch 60 is a three-position switch and is diagrammatically illustrated in FIG. 3 in the second or neutral position. The switch includes a rotating cam 61 which may be rotated counterclockwise to open the circuit to the unit 46a and rotated clockwise to open the circuit to the unit 46b. With the cam in the central position as shown in FIG. 3, both photosensitive units are connected into their respective circuits. The embodiment of FIG. 3 permits operation with scan speed control only, period control only, or scan speed and period control simultaneously. In instruments in which both scan speed and period control will be used at all times, the switch 60 can be omitted and both photosensitive units directly connected into their respective circuits.

In some applications of the invention, the scan motor control 30 is not operable over the entire range of output of the speed-period control circuit 40. That is to say, after the intensity of the lamp 45 reaches a certain value, the scanning speed of the motor 29 will not continue to decrease since, while the conductance of the photodiode may approach infinity, other resistances in the motor circuitry remain fixed and placed a limit on the range of scan speed control. With the embodiment of FIG. 3, the period control circuit continues to function with additional intensity of light from the lamp 45, adding further to the elimination of tracking error after the minimum scanning speed is achieved. The relative sensitivities of the scan speed control and the period control can be adjusted to provide any desired combination of reaction times depending upon the desired characteristics of each particular instrument.

The tracking accuracy control of the present invention provides speed suppression and period suppression as desired in the operation of the analyzer. This desired improvement in accuracy is achieved by means of an auxiliary control circuit which is isolated from the conventional circuitry of the instrument and creates no undesirable loading effects thereon.

The lamp 45 is preferably an incandescent lamp with the brilliance varying as a function of the driving current. Lamps with various current-brilliance characteristics can be selected to vary the relation between error signal and degree of suppression. Similarly, photosensitive units can be selected with various illumination-resistance characteristics. One type of unit found particularly advantageous in some embodiments is a cadmium-selenide photodiode.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In an analyzer having a light source, reference and sample beam paths, a monochromator and a wavelength scanning mechanism therefor, an electrical signal generator, a period filter circuit, and a servo for varying the intensity of the beam along one of the paths, the combination of:
   a drive motor in said wavelength scanning mechanism for continuously varying the wavelength of said monochromator output;
   a control circuit connected to said drive motor for operating said motor at a predetermined speed, said control circuit including a first resistance for setting said speed;
   a resistance-capacitance section in said period filter circuit between said generator and servo and including a second resistance for setting the time constant of said filter circuit and thereby controlling the response time of the servo;
   a lamp;
   amplifier means coupled to said signal generator for energizing said lamp as a function of said signal generator output;
   and photosensitive means for connecting in circuit with each of said resistances, with said photosensitive means positioned for radiation by said lamp and with the resistance of said means varying as a function of the light impinging therein.

2. In an analyzer having a light source, reference and sample beam paths, a monochromator and a wavelength scanning mechanism therefor, an electrical signal generator, a period filter circuit, and a servo for varying the intensity of the beam along one of the paths, the combination of:
   a drive motor in said wavelength scanning mechanism for continuously varying the wavelength of said monochromator output;
   a control circuit connected to said drive motor for operating said motor at a predetermined speed, said control circuit including a first resistance for setting said speed;
   a resistance-capacitance section in said period filter circuit between said generator and servo and including a second resistance for setting the time constant of said filter circuit and thereby controlling the response time of the servo;
   a lamp;
   amplifier means coupled to said signal generator for energizing said lamp as a function of said signal generator output;
   photosensitive means positioned for radiation by said lamp, with the resistance of said means varying as a function of the light impinging thereon;
   and a switch for selectively connecting said photosensitive means in circuit with said control circuit and with said resistance-capacitance section for changing the motor speed and the filter time constant, respectively, as a function of said signal generator output.

3. In an analyzer having a light source, reference and sample beam paths, a monochromator and a wavelength scanning mechanism therefor, an electrical signal generator, a period filter circuit, and a servo for varying the intensity of the beam along one of the paths, the combination of:
   a drive motor in said wavelength scanning mechanism;
   a control circuit connected to said drive motor for operating said motor at a predetermined speed, said control circuit including a motor-speed-varying section;
   a lamp;
   amplifier means coupled to said signal generator for energizing said lamp as a function of said signal generator output;
   and a photosensitive unit connected in circuit with said speed-varying section, with said photosensitive unit positioned for radiation by said lamp and with the resistance of said unit varying as a function of the light impinging thereon for varying said drive motor speed as a function of said signal generator output.

4. In an analyzer having a light source, a beam switching system producing reference and sample beam paths, a monochromator and a wavelength scanning mechanism therefor, a signal generator producing an output at the beam switching frequency, a demodulator operated in synchronism with said beam switching system, a period filter circuit, and a servo for varying the intensity of the beam along one of the paths, the combination of:
   a drive motor in said wavelength scanning mechanism for continuously varying the wavelength of said monochromator output;
   a control circuit connected to said drive motor for operating said motor at a predetermined speed, said control circuit including a voltage divider circuit for setting said speed;
   a lamp;
   amplifier means coupled to said signal generator for energizing said lamp as a function of said signal generator output;
   and a photosensitive unit connected into said voltage divider and positioned for radiation by said lamp with the resistance of said unit decreasing as the intensity of the light impinging thereon increases for decreasing said drive motor speed as said signal generator output increases.

5. In an analyzer having a light source, reference and sample beam paths, a monochromator and a wavelength scanning mechanism therefor, an electrical signal generator, a period filter circuit, and a servo for varying the intensity of the beam along one of the paths, the combination of:
   a resistance-capacitance section in said period filter circuit between said generator and servo for controlling the time constant of the period filter circuit and thereby the response time of the servo;
   a lamp;
   amplifier means coupled to said signal generator for energizing said lamp as a function of said signal generator output;
   and a photosensitive unit connected in shunt with said resistance-capacitance section and positioned for radiation by said lamp, with the resistance of said unit varying as a function of the light impinging thereon for varying the time constant of said filter circuit as a function of said signal generator output.

6. In an analyzer having a light source, a beam switching system producing reference and sample beam paths, a monochromator and a wavelength scanning mechanism therefor, a signal generator producing an output at the beam switching frequency, a demodulator operated in synchronism with said beam switching system, a period filter circuit, and a servo for varying the intensity of the beam along one of the paths, the combination of:
   a low pass filter section in said period filter circuit for limiting the response time of said servo, said filter section including a serially connected resistor;
   a lamp;

amplifier means coupled to said signal generator for energizing said lamp as a function of said signal generator output;

and a photosensitive unit connected in shunt with said resistor and positioned for radiation by said lamp, with the resistance of said unit decreasing as the intensity of the light impinging thereon increases for lowering the time constant of said period filter and decreasing the response time of said servo.

7. In an analyzer having a light source, reference and sample beam paths, a monochromator and a wavelength scanning mechanism therefor, an electrical signal generator, a period filter circuit, and a servo for varying the intensity of the beam along one of the paths, the combination of:

a drive motor in said wavelength scanning mechanism;

a control circuit connected to said drive motor for operating said motor at a predetermined speed, said control circuit including a motor-speed-varying section;

a lamp;

amplifier means coupled to said signal generator for energizing said lamp as a function of said signal generator output;

a resistance-capacitance section in said period filter circuit for controlling the time constant thereof and thereby the response time of the servo;

a first photosensitive unit connected in circuit with said speed varying section, with said first photosensitive unit positioned for radiation by said lamp and with the resistance of said first unit varying as a function of the light impinging thereon for varying said drive motor speed as a function of said signal generator output;

and a second photosensitive unit connected in shunt with said resistance-capacitance section and positioned for radiation by said lamp, with the resistance of said second unit varying as a function of the light impinging thereon for varying the time constant of said filter circuit as a function of said signal generator output.

8. An analyzer as defined in claim 7 including switch means connected in circuit between said first photosensitive unit and said speed-varying section and between said second photosensitive unit and said resistance-capacitance section for selectively disconnecting a photosensitive unit from its associated circuit section.

9. In a double beam optical null spectrophotometer having an electrical detector for generating an error signal which varies as a function of the intensity of the beam arriving at the detector, and a servo for varying the intensity of one of the beams as a function of the error signal to balance the beams, the combination of:

a filter circuit connected between the electrical detector and the servo for smoothing the operation of the servo and reducing the effect of noise in the error signal on the servo position, said filter circuit having a relatively long time constant;

filter control means including a photosensitive unit connected in said filter circuit and a lamp positioned for radiating said photosensitive unit; and means for energizing said lamp as a function of the error signal at the detector, with the resistance of said unit decreasing as the intensity of the light impinging thereon increases for lowering the time constant of said filter circuit and decreasing the response time of the servo.

References Cited by the Examiner
UNITED STATES PATENTS

| | | | |
|---|---|---|---|
| 2,856,468 | 10/58 | Berry | 346—32 |
| 2,913,654 | 11/59 | Clark. | |
| 2,978,625 | 4/61 | Braymer. | |

JEWELL H. PEDERSEN, *Primary Examiner.*

EMIL G. ANDERSON, *Examiner.*